Patented Nov. 12, 1946

2,411,074

UNITED STATES PATENT OFFICE 2,411,074

SCALE-PEPTIZING COMPOSITION

Samuel A. Winkelmann, West Columbia, Tex., and John Cox Wright, Abbeville, La., assignors to The Texas Company, New York, N. Y., a corporation of Delaware No Drawing. Application May 25, 1943, Serial No. 488,440

5 Claims. (Cl. 252—83)

Our invention relates to scale-peptizing compositions, and more specifically to an improved colloidal composition especially useful for preventing scale deposition and for removing scale from boilers, cooling systems, pipe lines, and the like.

In the past, many different types of colloidal compositions have been proposed for scale-peptizing purposes, but most of these have been relatively ineffective, or have had inherent disadvantages which have prevented their commercial utilization. The few compositions which have previously been found to be effective in desirably low concentrations have been composed of expensive and difficultly obtainable ingredients.

We have now discovered that colloidal compositions prepared from a tannin and a vegetable oil are highly effective scale-peptizing agents. We have found, for example, that compositions prepared from commercial quebracho extract and castor oil are inexpensive to produce, and are very effective both for preventing scale deposition, and for removing scale from metal surfaces.

Our new scale-peptizing agents comprise water-dispersible compositions of a tannin, or tannin-containing material, and a vegetable oil. When these components are mixed in various proportions, products are obtained which range from solids that are not dispersible in water, to semi-solids or viscous liquids that form temporary aqueous dispersions from which an oil phase separates out. We have now found, however, that within a very limited range of proportions, tannin-vegetable oil compositions may be prepared which are completely water-dispersible, forming stable dispersions from which no oil separates, even at relatively high temperatures.

Useful scale-peptizing colloids may be prepared when employing 65 to 85 parts by weight of oil per 100 parts by weight of tannin. This may amount to 40 to 60 parts by weight of oil per 100 parts by weight of commercial tannin extracts such as quebracho extracts. However, we prefer to use a still narrower range of proportions to insure obtaining products which will form stable dispersions. Thus, when using a solid quebracho extract of about 65% tannin content, we prefer to use 48 to 52 parts by weight of oil per 100 parts of extract, which amounts to 74 to 80 parts by weight of oil per 100 parts of tannin.

In preparing our tannin-vegetable oil compositions, we prefer to use a relatively pure tannin, or a dry, powdered extract containing at least 50% by weight of tannins. The tannins of the wood or bark of the red quebracho (*Quebrachia lorentzii*) are especially suited for use in our compositions, and very satisfactory products may be prepared from commercial quebracho extracts of the dry powdered types which contain at least 60% by weight of tannins.

The preferred vegetable oils for use in our compositions are those which contain substantial amounts of glycerides of hydroxy fatty acids. Drying oils or semi-drying oils are preferably employed in the "raw" state, rather than as boiled or blown oils. Raw castor oil is especially suited for use in our present invention, and our preferred compositions are prepared from raw castor oil and quebracho extracts.

In preparing our compositions, the tannin or tannin extract, in a dry, finely comminuted state, is mixed with the vegetable oil and the resulting mass is very thoroughly agitated to insure that each solid particle is wet with a film of the oil. Mixing devices such as are employed in the wetting of pigments, or the preparation of paste pigments, in the paint industry are suitable for use in the preparation of our compositions.

The initial compositions, comprising particles of tannin or tannin extract completely wetted with a film of oil, may be dispersed in water or aqueous solutions to yield stable dispersions which are suitable for scale-peptizing applications. However, the direct formation of dilute dispersions from our initial compositions may be quite difficult without the use of special equipment such as a colloid mill, or the like. For this reason we prefer to form a concentrated aqueous dispersion which may be stored and transported in that state, and may subsequently be diluted without requiring the use of any special mixing apparatus.

Suitable concentrated aqueous dispersions may be formed by slowly adding 180 to 240 parts by weight of water to 100 parts by weight of the initial anhydrous tannin-oil composition, while vigorously agitating the mixture. During this operation the mixture has a plastic-like consistency, and a heavy duty beater or kneading machine should be used to effect adequate mixing. Further improvement in the degree of dispersion can be secured by causing plastic flow of the composition under conditions of high internal shear. This may be accomplished by forcing the mixture through a small orifice, or between closely spaced oppositely rotating discs, or by using other equivalent expedients such as are employed in various commercial colloid mills.

It is to be understood that our basic compositions, as described above, may be modified by the incorporation of additional ingredients at any stage of their manufacture or use. Thus, when preparing a composition from quebracho extract and castor oil, we prefer to incorporate in the initial anhydrous composition a small amount of an essential oil, such as eucalyptus oil, in order to make the odor of the product more pleasing. From 1 to 3 parts of an essential oil per 100 parts of castor oil may suitably be added to the castor oil before mixing with the quebracho extract, or otherwise incorporated in the mixture during the initial preparation of the anhydrous composition.

Similarly, water-soluble ingredients may be incorporated when making the concentrated aqueous dispersion, or on subsequent dilution of the concentrated dispersion. For example, it is often advantageous to employ an alkali in conjunction with a scale-peptizing colloid in descaling or scale preventing applications. For such uses the alkali may be incorporated in our concentrated dispersions, or may be added at the time of preparing the dilute dispersion for scale-peptizing use.

Other oil-soluble or water-soluble modifying agents may be added to our compositions in accordance with the above principles. Insoluble but dispersible modifying agents may also be incorporated, preferably by mixing into the initial anhydrous composition, either before or after wetting the tannin or tannin extract with the oil. Additional scale-peptizing components such as oleo-resins, alginates, and the like, may be used in this manner, if desired. However, in our preferred compositions the tannin particles wet with oil comprise essentially the entire content of scale-peptizing colloids.

Our compositions may be used for purposes for which other known scale-peptizing colloids are employed. They are especially valuable for scale-peptizing operations at temperatures ranging from atmospheric temperatures to not substantially above 212° F. Among such uses may be mentioned descaling hot or cold water pipe systems, maintaining cooling systems free from scale, and cleaning pipe lines such as those carrying petroleum products. The effectiveness of our compositions as scale-peptizing agents appears to be due to the high colloidal charge carried by the dispersed particles. These compositions are thus adapted for other uses, for example, as counter-colloids, desludging agents, and the like.

In scale-peptizing uses, the amount of our compositions to be employed will, of course, depend on the character and amount of scale already present, and on the character and amount of water hardness or other potential scale components in the system to be treated. For the prevention of scale deposition from water of average hardness, e. g. 100–200 parts per million, our compositions may suitably be used in amounts of 0.01 to 0.10 pound, anhydrous basis, per 1000 gallons liquid capacity of the system, per week; or 0.5 to 5.0 fluid ounces of concentrated dispersion per 1000 gallons capacity per week. For descaling, considerably larger amounts may be used, for example, 5 to 10 fluid ounces of concentrated dispersion per week, per 1000 gallons liquid capacity of the system being descaled. These quantities are not critical, but are sufficiently representative to enable those skilled in the art to determine satisfactory dosages for any particular scale-peptizing use.

Our compositions are especially valuable for softening hard scales found in petroleum pipe lines, and for preventing scale deposition in such lines. We have found that our compositions are very active for scale-peptizing even when used in relatively minute amounts, directly in a large body of gasoline or other liquid petroleum product flowing through a pipe line. We have also found that our compositions, in the concentrations required for effective scale-peptizing action, have no detrimental effect on refined petroleum products, or even in finished products containing special additives, such as gasolines containing tetra-ethyl lead, gum inhibitors, and the like.

The compositions are preferably employed in dilute dispersions corresponding to dilutions of the concentrated dispersions ranging from 50/1 to 500/1, and preferably 200/1 to 400/1. Suitable dilute dispersions may contain 0.5 to 2.0 pounds of our quebracho-castor oil composition, anhydrous basis, per 100 gallons. These dilute suspensions may be used for scale-prevention treatment of pipe lines by injection into the liquid petroleum product flowing in the line, at a rate of 20 to 40 parts per million. Considerably higher treating rates may be employed for initial cleaning operations on lines which have heavy scale deposits. Such cleaning operations are preferably completed by the use of a pipe line scraper having a close-fitting metal disc, or other rigid scraping element, to remove scale which has been softened but not dispersed by the treating agent.

Our invention will be further illustrated by the following specific examples:

*Example I*

To 100 parts by weight of powdered quebracho extract (65% tannins) 50 parts by weight of castor oil and 1 part by weight of eucalyptus oil were slowly added, while vigorously agitating the mixture. Water was then slowly added, to the extent of 333 parts by weight, with continued vigorous agitation. The concentrated dispersion thus obtained was employed for descaling a cooling system for gas compressors. The cooling system had a capacity of 4200 gallons, and the concentrated dispersion was introduced at a rate of 32 fluid ounces per week. Substantially complete descaling was obtained after six weeks' treatment, and the treating rate was then reduced to 16 fluid ounces per week for the prevention of scale deposition.

*Example II*

To 100 parts by weight of powdered quebracho extract (65% tannins) 50 parts by weight of castor oil and 1 part by weight of eucalyptus oil were slowly added and the mixture was thoroughly agitated to insure complete wetting of each particle of the extract. Approximately 300 parts by weight of water were then slowly added while vigorously agitating the mixture. The product was then extruded through a 1/8 inch die under a pressure differential of 310 pounds per square inch. The resulting dispersion was then diluted with water at a dilution ratio of 200/1. This dilute dispersion is employed for preventing scale deposition in a gasoline pipe line. Injection of this dispersion directly into the gasoline being transported in the line, at a rate of 0.15 fluid ounce per barrel of gasoline, maintains the pipe line free from scale deposits and has no adverse effect on either clear or leaded gasolines.

It is to be understood that the above examples are merely illustrative, and do not limit the scope of our invention. As has previously been pointed out, other tannins or tannin-containing materials may be substituted for the quebracho extract of these examples. Similarly other vegetable oils may be substituted for the castor oil used in the compositions of the examples, and additional modifying ingredients may also be incorporated, if desired. Furthermore, since the action of our compositions is physical rather than chemical, their utility as scale-peptizing agents is not limited to any particular types of scale or to any particular treating methods. In general, it may be said that all equivalents and modifications which would naturally occur to those skilled in the art are included in the scope of this invention. Only such limitations should be imposed on the scope of our invention as are indicated in the appended claims.

We claim:

1. A scale-peptizing composition comprising a solid comminuted quebracho extract of at least 60% tannin content, the particles of said extract having an adsorbed film of castor oil in an amount of 0.4 to 0.6 part by weight of oil per part of extract.

2. A colloidal composition comprising an aqueous dispersion of a solid, comminuted tannin-containing material, the dispersed particles having an adsorbed film of a vegetable oil, said vegetable oil being absorbed on said tannin-containing material in amounts ranging from 0.65 to 0.85 part by weight of oil per part by weight of tannin.

3. A colloidal composition comprising an aqueous dispersion of a solid, comminuted quebracho extract of at least 60% tannin content, the particles of said extract having been wetted with castor oil, said quebracho extract containing amounts of castor oil ranging from 0.40 to 0.60 part by weight of castor oil per part by weight of quebracho extract.

4. A colloidal composition comprising an aqueous dispersion of powdered quebracho extract of at least 60% tannin content, the particles of said extract having an adsorbed film of castor oil in an amount of 0.4 to 0.6 part by weight of oil per part of extract.

5. A process for decreasing scale deposition in a system in which a metal surface is in contact with a liquid containing scale-forming substances, which comprises incorporating in said liquid an aqueous dispersion of a solid, comminuted quebracho extract of at least 60% tannin content, the particles of said extract having been wetted with castor oil, said quebracho extract containing amounts of castor oil ranging from 0.40 to 0.60 part by weight of castor oil per part by weight of quebracho extract.

SAMUEL A. WINKELMANN.
JOHN COX WRIGHT.